(12) United States Patent
Brandsdorfer et al.

(10) Patent No.: US 9,817,793 B1
(45) Date of Patent: Nov. 14, 2017

(54) FORMATTING ELECTRONIC MAIL SUBJECT LINE WITH BIDIRECTIONAL TEXT

(71) Applicant: International Business Machines Corporation, Armonk, NY (US)

(72) Inventors: Amir Brandsdorfer, Jerusalem (IL); Ira Fishbein, Ma'ale Adumim (IL); Tomer Mahlin, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 15/134,424

(22) Filed: Apr. 21, 2016

(51) Int. Cl.
*G06F 17/21* (2006.01)
*H04L 29/08* (2006.01)
*H04L 12/58* (2006.01)

(52) U.S. Cl.
CPC ......... *G06F 17/211* (2013.01); *H04L 51/066* (2013.01); *H04L 67/02* (2013.01)

(58) Field of Classification Search
USPC ....................................................... 715/256
See application file for complete search history.

(56) References Cited

U.S. PATENT DOCUMENTS

| | | | | |
|---|---|---|---|---|
| 6,493,735 B1 * | 12/2002 | Kumhyr | ................ | G06F 17/211 715/236 |
| 7,761,519 B2 | 7/2010 | Schultz | | |
| 2002/0143825 A1 * | 10/2002 | Feinberg | ............. | G06F 17/2223 715/210 |
| 2009/0063965 A1 * | 3/2009 | Lee | ..................... | G06F 17/2223 715/273 |
| 2009/0144666 A1 * | 6/2009 | Lu | ......................... | G06F 17/211 715/859 |
| 2009/0150496 A1 * | 6/2009 | Lu | ........................ | G06Q 10/107 709/206 |
| 2011/0106524 A1 * | 5/2011 | Mousaad | ................ | G06F 17/21 704/8 |
| 2011/0107202 A1 * | 5/2011 | El-Shishiny | ............ | G06F 17/21 715/243 |
| 2012/0109634 A1 * | 5/2012 | Lanin | .................. | G06F 17/2223 704/8 |
| 2014/0006929 A1 * | 1/2014 | Swartz | .................. | G06F 3/0237 715/234 |
| 2015/0106700 A1 * | 4/2015 | Allawi | .................... | G06F 17/24 715/256 |

OTHER PUBLICATIONS

Arning, Cleaning Up Your Subject Lines, IBM DeveloperWorks, p. 1-8, Jul. 12, 2004.*

(Continued)

*Primary Examiner* — Frank D Mills
(74) *Attorney, Agent, or Firm* — Heather S. Chatterton (57) ABSTRACT

The subject line, and any subject abbreviations in the subject line, of an email, received by an email client, is identified. The subject line contains bidirectional text. The email client is configured to display text for reading in a particular direction. The subject abbreviations are moved to be displayed to one side of the subject text according the direction the email client is configured to display text for reading.

20 Claims, 4 Drawing Sheets

(56) References Cited

OTHER PUBLICATIONS

Davis et al., "Unicode® Standard Annex #9: Unicode Bidirectional Algorithm", Technical Reports, copyright © 2000-2015 Unicode, Inc., 52 pages. Last accessed Jan. 14, 2016. http://unicode.org/reports/tr9/.
Sbiz, "Clean Subject" Add-ons for Thunderbird, 2 pages. Last accessed Jan. 14, 2016. https://addons.mozilla.org/en-US/thunderbird/addon/clean-subject/.
Unknown, "Reply indicators", MozillaZine Knowledge Base, Copyright © 1998-2007 MozillaZine, 2 pages. Last accessed Jan. 14, 2016. http://kb.mozillazine.org/Reply_indicators.
Unknown, "Use RE: and FW: instead of localized subject prefix", MSOutlook.info: Real World Questions, Real World Answers, Copyright MSOutlook.info 2007-2016, 3 pages. Last accessed Jan. 14, 2016. http://www.msoutlook.info/question/656.
Unknown, "Source: trunk / common / properties / scriptMetadata.txt @ 12239", Common Locale Data Repository: Bug Tracking, Copyright 1991-2016 Unicode, Inc., 4 pages. Last accessed Jan. 14, 2016. http://unicode.org/cldr/trac/browser/trunk/common/properties/scriptMetadata.txt.
Unknown, "List of email subject abbreviations", Wikipedia, The Free Encyclopedia, 6 pages. Last accessed Apr. 19, 2016. https://en.wikipedia.org/wiki/List_of_email_subject_abbreviations.
Unknown, "Internet Message Format: Informational Fields", RFC 5322, Oct. 2008, Section 3.6.5, pp. 27-28. Last accessed Apr. 19, 2016. https://tools.ietf.org/html/rfc5322#section-3.6.5.

\* cited by examiner

FORMATTING ELECTRONIC MAIL SUBJECT LINE WITH BIDIRECTIONAL TEXT

BACKGROUND

The present disclosure relates to text formatting and, more specifically, to formatting bidirectional text within an email subject line.

The standard format of electronic mail provides a subject line to introduce the recipient to the topic covered by the email. Most modern email exchanges have incorporated subject abbreviations into the subject line, providing a shorthand for some common email statuses, particularly email chains where each successive email relates to one or more previously transmitted messages. Protracted exchanges of email creates an accumulation of subject abbreviations within the subject line.

When emails are exchanged across email clients with different primary language preferences, subject abbreviations may accumulate in multiple languages. When one such language is displayed in a left-to-right direction and another is displayed in a right-to-left direction, this accumulation introduces bidirectional text into the subject line.

SUMMARY

Disclosed herein are embodiments of a method, computer program product, and computer system for formatting bidirectional text. An email is received by an email client, and the subject line of the email is identified. The email client is configured to display text for reading in a particular direction, and the particular direction the client is configured to display text for reading is identified. The subject line contains bidirectional text, and any subject abbreviations in the subject line are identified. The subject abbreviations are moved to be displayed to one side of the subject text according the direction the email client is configured to display text for reading.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to text formatting, and more particular aspects relate to formatting bidirectional text within an email subject line. While the present disclosure is not necessarily limited to such applications, various aspects of the disclosure may be appreciated through a discussion of various examples using this context.

Aspects of the present disclosure are directed towards a method of ensuring the readability of an email subject line including bidirectional text. This may include formatting the text of an email subject line to ensure the subject text of the subject line may be viewed without subject abbreviations appearing throughout the text. Described further herein, in embodiments, formatting of the email subject line may include formatting the subject abbreviations to all appear to one side of the subject text. In embodiments, formatting the text may also include visually distinguishing the subject text from the subject abbreviations.

Communicating across language barriers poses a number of problems, but bidirectional text, in particular, raises some unique complications in the exchange of electronic mail. Subject abbreviations, such as "Fwd:" which indicates a message has been forwarded, can provide a helpful indicator to a mail recipient of a message's exchange history. However, as a message is exchanged multiple times the accumulation of subject abbreviations can become cumbersome and in some cases, such as cases involving bidirectional text, accumulated subject abbreviations may render the subject text itself unreadable. The subject text may be unreadable due to the subject text being visually intermixed with abbreviations, different abbreviations appearing on both sides of the subject text, etc.

User interfaces (UIs), such as an email client interface, may be rigidly configured to display text in only one particular direction according to the primary display language of the UI. Each display language has a natural flow direction associated with it. In the case of German, English, Russian, etc., text is displayed in a left-to-right (LTR) direction, but in other languages, such as Arabic, Hebrew, Farsi, etc., text is displayed in a right-to-left (RTL) direction. Text (i.e. the email subject line) displayed on a UI may be in any language, including languages which differ from the display language of the UI in terms of flow direction. When a line of text includes characters from both an LTR and an RTL language, bidirectional text is produced. Due to most interfaces being configured to display text in only one direction, the presence of characters meant to be displayed in the opposing direction may result in a jumbled display. For instance, on an English language interface, a line of text including both English and Arabic characters may have the Arabic characters appearing out of sequence within the line of text, perhaps even interstitial within the English words, rendering the text unreadable. This may prove particularly problematic in the case of email subject lines, as subject abbreviations may accumulate in multiple languages. In subject lines including bidirectional text, subject abbreviations may be interspersed through the subject line, interrupting the subject text.

Some email clients may be configured to translate, automatically or on command, subject abbreviations to the interface's primary display language. Others may only utilize subject abbreviations in a single language, but both suggestions fail to resolve the problem of subject line readability, especially in cases involving bidirectional text in the subject line. Translations may suffer from the questionable quality of automated software and, additionally, may be unable to correctly identify the language of the foreign text in cases where the foreign characters become intermixed with characters from other languages due to the interface's handling of bidirectional text.

Other email clients may attempt to resolve the issue by allowing a user to register foreign abbreviations with the email client, or may attempt to delete the subject abbreviations entirely. These are some attempts made by email clients to avoid the problem, but since there is no solution implemented consistently across email clients the problem is only resolved in cases where the messages exchanged all originate from a common email client. However, it is far more common that a mail chain will involve many different people using different email clients on different platforms.

By focusing on ensuring the readability of the subject line and keeping the subject abbreviations separate from the subject text, the problem may be resolved independent of the user's choice of email client. This may also provide resolution to the problem regardless of the languages present in the text or the preferred language of the sending or receiving email client.

Figure 1:
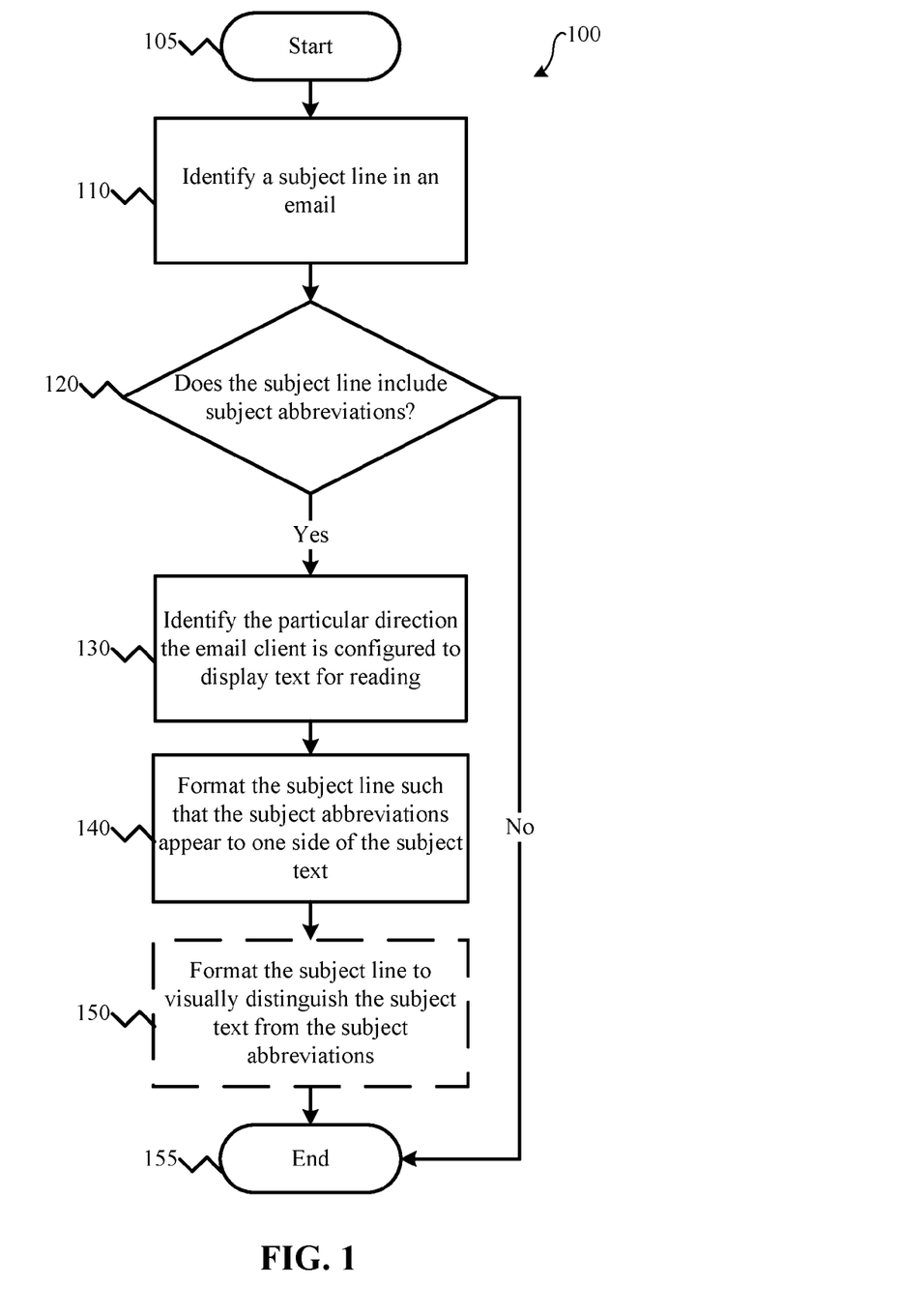
FIG. 1 depicts a flowchart of an example method for formatting the subject line of an email to ensure readability of bidirectional text, in accordance with embodiments of the present disclosure.

Referring now to FIG. 1, a flowchart of an example method 100 for formatting the subject line of an email to ensure readability of bidirectional text is depicted, in accordance with embodiments of the present disclosure. The method 100 may generally be executed in the environment of an email client. The method 100 may be executed within the client by the client itself, on the client by an external program, etc.

After beginning the method 100 at operation 105, an email with a subject line is received by an email client at operation 110. In some embodiments, the email client or the UI used to display the client may be configured to display text in a particular flow direction. For example, the particular direction may be LTR, such as if the client or UI is configured for languages such as German, English, Russian, etc. Alternatively, the direction may be RTL, such as if the client or UI is configured for languages such as Arabic, Hebrew, Farsi, etc.

In some embodiments, the subject line may contain bidirectional text. The bidirectional text may include any combination of languages, where the text as a whole contains a combination of characters where some characters are intended to be read the RTL direction and others are intended to be read in the LTR direction. For example, the subject line may include text constructed with both English language and Hebrew language characters.

At operation 120, the subject line is assessed for the presence of subject abbreviations. The subject line may be assessed for the presence of subject abbreviations in a number of ways, but in some embodiments this may involve comparison to a list of known abbreviations. For example, the subject line may be identified to include the English language subject abbreviation "Re:" which indicates the message is in regards to a previous message, or a similar abbreviation in another language. This example may provide a relatively simple means of assessing for subject abbreviations, as subject abbreviations may be identified in advance. If no subject abbreviations are found in the subject line, the method may terminate at operation 155.

If subject abbreviations are found in the subject line at operation 120, the particular direction the email client is configured to display text for reading is identified at operation 130. The particular direction the email client is configured to display text for reading, the flow direction, may be determined in a number of ways, but in some embodiments may involve identifying a display language preference associated with the email client or the UI used to display the client. Each display language has an associated flow direction which determines how the interface is arranged for viewing, as discussed above. For example, the display language preference associated with the email client may be identified as English, in which case the particular direction the text is configured for reading, or flow direction, may be identified as LTR.

In some embodiments, identifying the direction the email client is configured to display text for reading may involve identifying preset program preferences indicating a preferred flow direction. The preset program preferences may be associated with the email client itself, with the UI used to display the email client, etc. The email client may be a web application and identifying the direction the email client is configured to display text for reading may involve identifying a language preference associated with a web browser used to view the email client.

At operation 140, the subject line may be formatted such that each subject abbreviation is displayed to one side of the subject text per the direction the email client is configured to display text for reading. The formatted subject line may generally be displayed on a monitor or other display device by the email client itself, by another UI, etc. Formatting the subject line may be accomplished in a number of ways, but in some embodiments may involve the injection of Unicode Control Characters (UCC) into the subject line. UCC are Unicode characters used to control the display of text, while the characters themselves have no visual or spatial representation. For example, if the particular direction the client is configured to display text is LTR, then formatting the subject line may be accomplished as follows (where LRE, LRM and PDF are UCC):

Formatted Subject=<LRE>+[ . . . all Subject Abbreviations . . . ]+<LRM>+[Subject Text]+<PDF>

Alternatively, in some embodiments, if the particular direction the client is configured to display text is RTL, then formatting the subject line may look as follows (where RLE, RLM, and PDF are UCC):

Formatted Subject=<RLE>+[ . . . all Subject Abbreviations . . . ]+<RLM>[Subject Text]+<PDF>

Other embodiments may involve formatting the subject line by injecting Hypertext Markup Language (HTML) or other equivalent markup, inserting the subject text and the subject abbreviations into different cells of a table, etc. For example, in an embodiment incorporating an HTML table, a subject line may be received by an email client on an LTR interface as:

[LTR Abbr.] {LTR Subject Text A} [RTL Abbr.] {LTR Subject Text B} and be formatted using the HTML table as:

| [LTR Abbr.] [RTL Abbr.] | {LTR Subject Text A & B} |

Some embodiments may incorporate optional operation 150 and format the subject text and the subject abbreviations such that the subject text is visually distinguished from the subject abbreviations when the subject line is displayed. The subject text may be visually distinguished from the subject abbreviations by formatting a background color, formatting a text color, formatting an underline, etc., provided that the subject text and subject abbreviations are formatted differently. In some embodiments, the formatting may be such that subject text is more easily visible than the subject abbreviations. For example, the subject abbreviations may appear in blue colored text, and the subject text may appear in red colored text. As another example, in a subject line the subject text may be formatted to appear underlined and the subject abbreviations may be formatted not to appear underlined, e.g.:

LTR Abbr. RTL. Abbr. <u>LTRSubjectText</u>

Figure 2A:
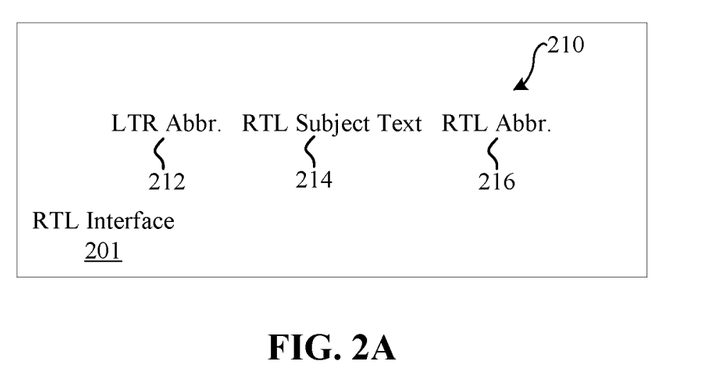
FIGS. 2A and 2B depict an example of formatting the subject text and subject abbreviations to visually distinguish them from one another for an RTL interface, in accordance with embodiments of the present disclosure.
Figure 2B:
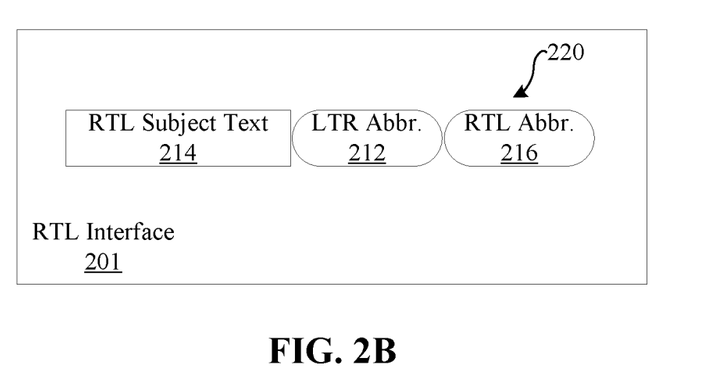

Referring now to FIGS. 2A and 2B, an example of formatting the subject text and subject abbreviations to visually distinguish them from one another is shown for an RTL interface 201. FIG. 2A depicts an example of how subject line 210 may appear on the RTL interface 201 without correction. When received on RTL interface 201, the subject line 210 may be disordered by the presence of LTR abbreviation 212. Instead of appearing in front of RTL subject text 214 (i.e., the right for the RTL interface 201) along with RTL abbreviation 216, LTR abbreviation 212 appears at the end of the RTL subject text 214 (i.e. the left for the RTL interface 201).

Depicted in FIG. 2B is subject line 220, an example of how subject line 210 may be reformatted to resolve the readability issues, according to the present embodiments. Subject line 220 shows both LTR abbreviation 212 and RTL abbreviation 216 in front (i.e., to the right for RTL interface 201) of the RTL subject text 214. As described above, subject line 220 may be formatted by the injection of UCC, using HTML markup, etc.

FIG. 2B depicts the RTL subject text 214 enclosed in a rectangular graphic and the subject abbreviations 212, 216 enclosed within oval graphics. This is one example of formatting the subject line to visually distinguish the subject text 214 from the subject abbreviations 212, 216. The oval and rectangular graphics may represent other graphics or other text formatting for other embodiments. For example, the rectangular graphic may represent, among other options, other graphic shapes, bold or underlined text, a background colored for increased visibility (e.g. yellow), or a text color selected for increased visibility (e.g. red). Likewise, the oval graphic may represent differently formatted text as well, such as other shapes or a text or background color selected for decreased visibility (e.g. grey). In some embodiments RTL subject text 214 may have a different, visually distinguishing format, such as a graphic shape, text color, etc., and the subject abbreviations 212, 216 may be formatted normally, or the inverse, with the subject text 214 formatted normally and subject abbreviations 212, 216 visually distinguished by formatting and displaying a background color, graphic, etc.

Figure 3A:
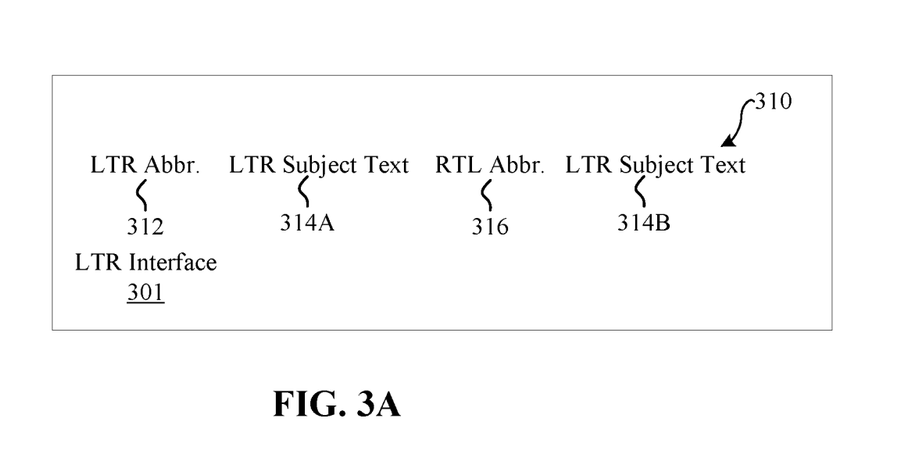
FIGS. 3A and 3B depict an example of formatting the subject text and subject abbreviations to visually distinguish them from one another for an LTR interface, in accordance with embodiments of the present disclosure.
Figure 3B:
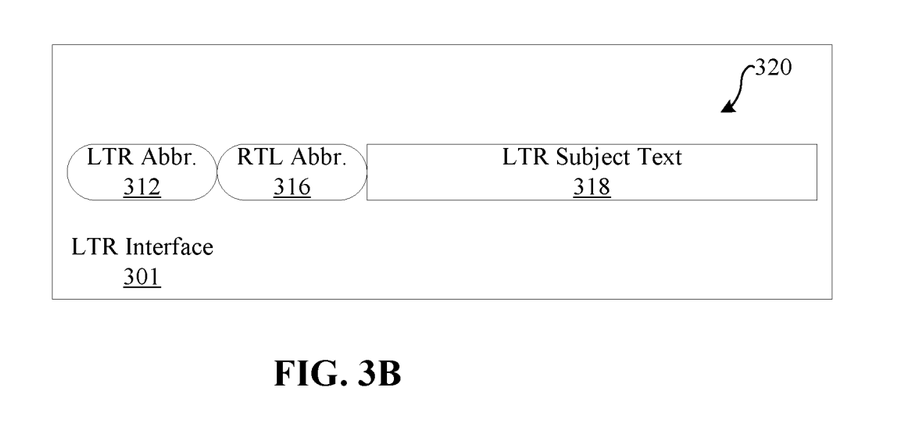

FIGS. 3A and 3B depict a similar example of formatting the subject line, depicted on an LTR interface 301. In FIG. 3A, a subject line 310 is shown disordered on the LTR interface 301 by the presence of an RTL abbreviation 316 appearing within the subject text so that the subject text appears in a first section 314A and a second section 314B. An LTR abbreviation 312 appears to the front (i.e., the left for the LTR interface 301) of the first section of the subject text 314A.

In FIG. 3B, subject line 320 shows how subject line 310 may be reformatted according to embodiments disclosed herein. The RTL abbreviation 316 appears to the front (i.e., the left for the LTR interface 301) of the subject line 320 along with the LTR abbreviation 312. The LTR subject text 318 is the result of the first portion of the subject text 314A and the second portion of the subject text 314B, no longer being interrupted by the presence of RTL abbreviation 316. In some embodiments, the subject line 320 may alternatively be formatted such that the subject abbreviations 312 and 316 appear behind (i.e., to the right for LTR interface 301) the subject text 318, or otherwise formatted to display the subject abbreviations 312, 316 to allow for readability of the subject text 318.

Subject line 320 shows the subject text 318 visually distinguished by being enclosed within a rectangular graphic. Subject abbreviations 312, 316 are distinguished by being enclosed within an oval graphic. The graphics may represent other shapes in other embodiments, or other formatting options for visually distinguishing the subject text 318 from the subject abbreviations 312, 316. In some embodiments, the subject line may be formatted to visually distinguish the subject text from the subject abbreviations prior to formatting the subject abbreviations to appear to one side of the subject text, in others the subject line may be formatted to visually distinguish the subject text after or without formatting the subject abbreviations to appear to one side of the subject text.

Figure 4:
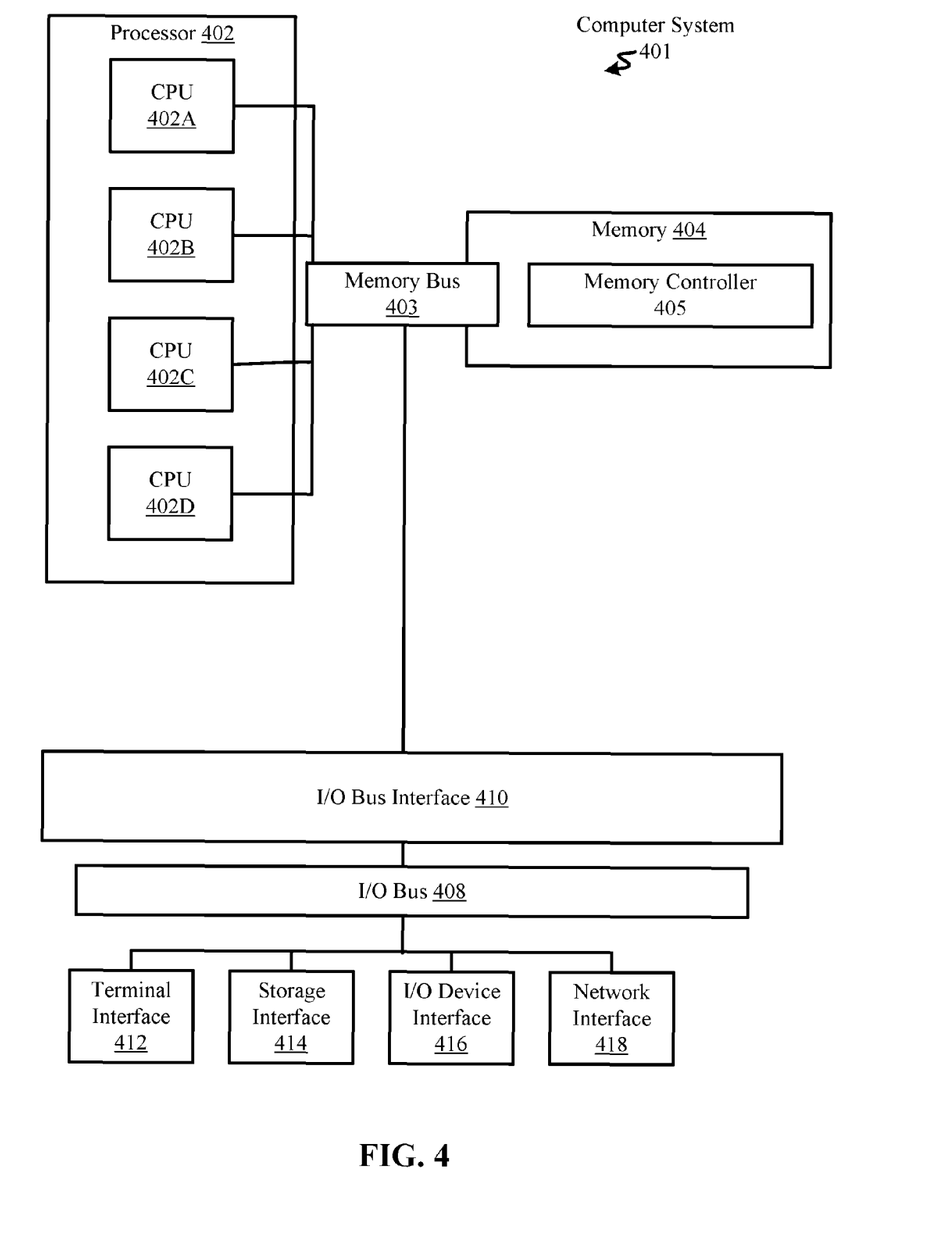
FIG. 4 depicts a high-level block diagram of an example computer system (i.e., computer) that may be used in implementing one or more of the methods or modules described herein, in accordance with embodiments of the present disclosure.

Referring now to FIG. 4, shown is a high-level block diagram of an example computer system (i.e., computer) 401 that may be used in implementing one or more of the methods or modules, such as example method 100, and any related functions or operations, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may comprise one or more levels of on-board cache.

In some embodiments, the memory subsystem 404 may comprise a random-access semiconductor memory, storage device, or storage medium (either volatile or non-volatile) for storing data and programs. In some embodiments, the memory subsystem 404 may represent the entire virtual memory of the computer system 401, and may also include the virtual memory of other computer systems coupled to the computer system 401 or connected via a network. The memory subsystem 404 may be conceptually a single monolithic entity, but, in some embodiments, the memory subsystem 404 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 404 may contain elements for control and flow of memory used by the CPU 402. This may include a memory controller 405.

Although the memory bus 403 is shown in FIG. 4 as a single bus structure providing a direct communication path among the CPUs 402, the memory subsystem 404, and the I/O bus interface 410, the memory bus 403 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, mobile device, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for formatting bidirectional text, the method comprising:
   identifying a subject line of an email, the email received by an email client, the email client configured to display text for reading in a particular direction, the subject line containing bidirectional text;
   identifying subject abbreviations in the subject line;
   identifying the particular direction the email client is configured to display text for reading; and
   formatting the subject line such that one or more of the subject abbreviations are moved to be displayed at one side of the subject line per the particular direction the email client is configured to display text for reading.

2. The method of claim 1, further comprising formatting the subject text and the subject abbreviations such that the subject text is visually distinguished from the subject abbreviations when the subject line is displayed.

3. The method of claim 2, wherein the subject text is visually distinguished from the subject abbreviations by formatting a background color.

4. The method of claim 2, wherein the subject text is visually distinguished from the subject abbreviations by formatting a text color.

5. The method of claim 2, wherein the subject text is visually distinguished from the subject abbreviations by formatting an underline.

6. The method of claim 1, wherein the particular direction the email client is configured to display text for reading is left-to-right; and
   wherein the subject abbreviations are moved to be displayed to the left of the subject text.

7. The method of claim 1, wherein the particular direction the email client is configured to display text for reading is right-to-left; and
   wherein the subject abbreviations are moved to be displayed to the right of the subject text.

8. The method of claim 1, wherein identifying the particular direction the email client is configured to display text for reading comprises identifying a display language preference associated with the email client, the display language preference associated with a flow direction.

9. The method of claim 1, wherein identifying the particular direction the email client is configured to display text for reading comprises identifying preset program preferences, the preset program preferences indicating a preferred flow direction.

10. The method of claim 1, wherein the email client is a web application.

11. The method of claim 10, wherein identifying the particular direction the email client is configured to display text for reading comprises identifying a display language preference associated with a web browser used to view the email client, the display language preference associated with a preferred flow direction.

12. The method of claim 1, wherein formatting the subject line is accomplished by injecting Unicode Control Characters.

13. The method of claim 1, wherein formatting the subject line is accomplished by injecting HTML markup.

14. The method of claim 1, wherein formatting the subject line is accomplished by inserting the subject text and the subject abbreviations into different cells of an HTML table.

15. A computer system for formatting bidirectional text, the computer system comprising:
    a memory; and
    a processor in communication with the memory, wherein the computer system is configured to perform a method, the method comprising:
        identifying a subject line, with bidirectional text, of an email, the email received by an email client, the email client configured to display text for reading in a particular direction;
        identifying one or more subject abbreviations in the subject line;
        identifying the direction the email client is configured to display text for reading; and
        formatting the subject line such that one or more of the subject abbreviations is moved to be displayed to one side of the subject text per the direction the email client is configured to display text for reading.

16. The computer system of claim 15, wherein the method further comprises formatting the subject text and the subject abbreviations such that the subject text is visually distinguished from the subject abbreviations when the subject line is displayed.

17. The computer system of claim 15, wherein formatting the subject line is accomplished by injecting Unicode Control Characters.

18. A computer program product for formatting bidirectional text, the computer program product comprising a computer readable storage medium having program instructions embodied therewith, wherein the computer readable storage medium is not a transitory signal per se, the program instructions executable by a processor to perform a method comprising:

identifying a subject line, with bidirectional text, of an email, the email received by an email client, the email client configured to display text for reading in a particular direction;

identifying one or more subject abbreviations in the subject line;

identifying the direction the email client is configured to display text for reading; and formatting the subject line such that one or more of the subject abbreviations is moved to be displayed to one side of the subject text per the direction the email client is configured to display text for reading.

19. The computer program product of claim 18, wherein the method further comprises formatting the subject text and the subject abbreviations such that the subject text is visually distinguished from the subject abbreviations when the subject line is displayed.

20. The computer program product of claim 18, wherein formatting the subject line is accomplished by injecting Unicode Control Characters.

* * * * *